United States Patent [19]

Jacquemin et al.

[11] Patent Number: 4,515,560

[45] Date of Patent: May 7, 1985

[54] GRILL ELEMENT OF CAST METAL FOR SOLID-FLUID HEAT EXCHANGE AT VERY HIGH TEMPERATURE COMPRISING A LATCHING DEVICE WHICH IS INTEGRATED IN THE GRILL STRUCTURE

[75] Inventors: Claude Jacquemin; Florent Provost; André Seinera, all of Ugine, France

[73] Assignee: Ugine Aciers, Paris, France

[21] Appl. No.: 565,724

[22] Filed: Dec. 27, 1983

[30] Foreign Application Priority Data

Dec. 30, 1982 [FR] France .................... 82 22236

[51] Int. Cl.³ .................... F27D 15/02; F27B 9/14; F26B 9/00
[52] U.S. Cl. .................... 432/80; 34/164; 432/134
[58] Field of Search .................... 432/80, 134; 34/164

[56] References Cited

U.S. PATENT DOCUMENTS 3,170,775  2/1965  Howell, Jr. .................... 34/164
3,753,299  8/1973  Schreiner .................... 34/164
4,078,883  3/1978  Arnold .................... 34/164

OTHER PUBLICATIONS

Pages 271, 272, 273, and 274 of Industrial Furnaces, 5th edition by W. Trinks and M. H. Mawhinnex, Copyright 1961 by John Wiley & Sons, N.Y. N.Y.

Primary Examiner—John J. Camby
Attorney, Agent, or Firm—Dennison, Meserole, Pollack & Scheiner

[57] ABSTRACT

The cast metal grill element, which is the subject of this invention, concerns an apparatus for heat exchange between a solid in the divided condition, at high temperature, and a fluid, and comprises a plate of refractory steel, which is apertured with holes therethrough and the upper face of which comprises at least one recessed region, in the bottom of which is a hole in which the leg of a connecting member is engaged, the connecting member securing the grill element to its support. The grill element is for use in particular in cement works, in an apparatus for heat exchange between clinker and air.

8 Claims, 7 Drawing Figures

GRILL ELEMENT OF CAST METAL FOR SOLID-FLUID HEAT EXCHANGE AT VERY HIGH TEMPERATURE COMPRISING A LATCHING DEVICE WHICH IS INTEGRATED IN THE GRILL STRUCTURE

BACKGROUND OF THE INVENTION

The grill element which is the subject of the present invention very broadly concerns an apparatus for heat exchange between a solid in a divided condition at a very high temperature, and a fluid.

The invention also concerns a method of preheating a fluid by heat exchange with a divided solid which is at a very high temperature, in which solid particles or grains are dropped onto a grill element, through the openings in which a fluid is injected in a counter-flow mode. The method according to the invention is applied in particular to the construction of an apparatus for preheating the air which is introduced into a rotary furnace such as a cement works furnace, in order to burn the fuel.

It is known for the air which is used as an oxidant in cement works furnaces to be preheated by heat exchange with the clinker which is discharged at the lower end of such furnaces, at a temperature on the order of 1400° C. The clinker is generally in the form of grains with a mean diameter on the order of from 20 to 30 mm and it drops on to the grill elements which have holes therethrough, through which the air is injected in a counter-flow mode. That air is heated by contact with the grains of clinker and is thus raised to a temperature on the order of 1200° to 1400° C. The grill elements are fixed or movable. Each movable element is secured in position by a catch or latching device with a mechanical carrying means which transmits thereto an alternating movement to cause the layer of clinker to be progressively displaced along its surface. Thus, the clinker goes from one grill element to another along a discharge passage, undergoing progressive cooling as it does so. At the end of the passage, the clinker, being sufficiently cooled by the flow of air, is discharged to the crushing means.

The accompanying drawings will provide for better understanding of the features of a latching device which is used for a grill element of conventional design for heat exchange between a divided solid and a fluid, and those of a latching device which is integrated in the grill structure of a grill element according to the present invention:

Figure 1:
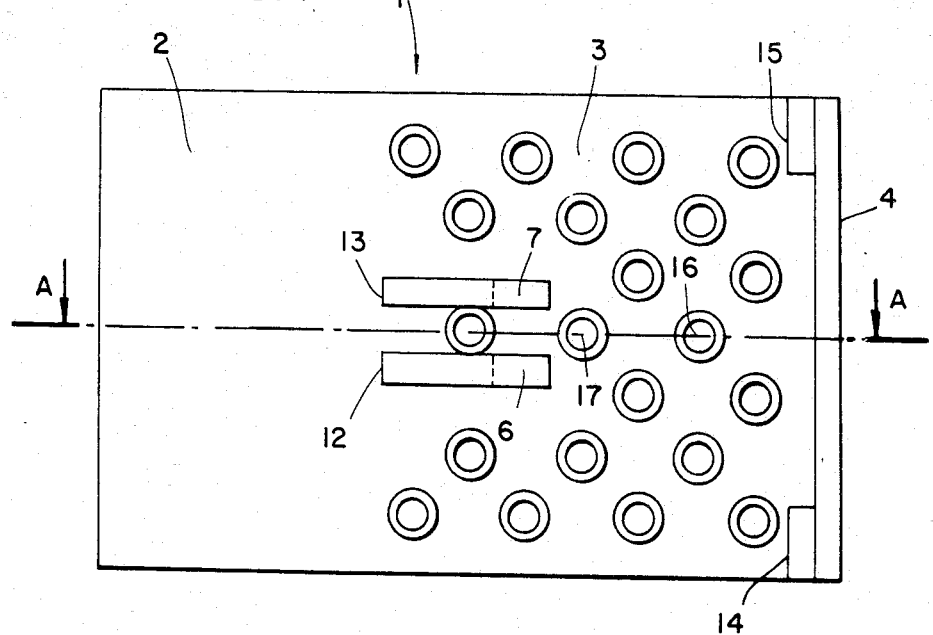
FIG. 1 shows a view along the line indicated by B (see FIG. 3) of the bottom face of a grill element of known type.
Figure 2:
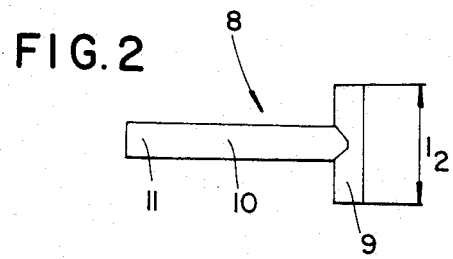
FIG. 2 shows a T-shaped connecting member for fixing the grill element to its support.
Figure 3:
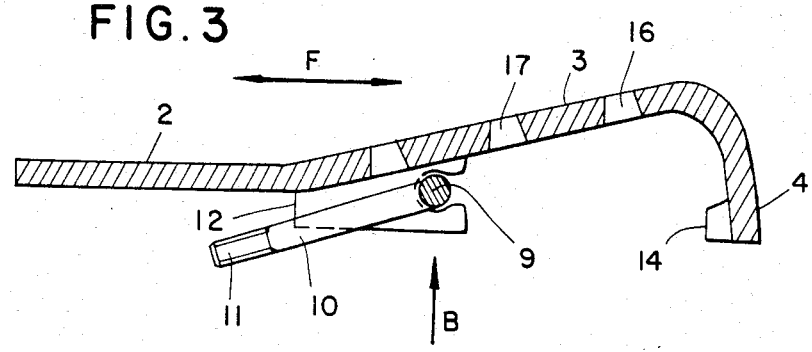
FIG. 3 shows a view in section taken along line AA of the grill element in FIG. 1, with the connecting member shown in FIG. 2 being shown in its latching position.

FIGS. 1, 2 and 3 are diagrammatic views of a grill element 1 of known type for receiving grains of clinker from a cement works furnace, and a connecting member for connecting it to a support. The element comprises a plate of cast refractory steel comprising a substantially horizontal region 2 on which the front end of the preceding plate is intended to rest, and an inclined region 3 which has holes therethrough and which is delimited by a front portion 4. The grill element rests on a fixed or movable support. In the case of a movable support, the grill element is moved with a reciprocating motion as indicated by the double-headed arrow F, the effect of which is to promote a sliding movement of the clinker from the region 2 of the grill element to the front portion 4 thereof, which, by virtue of its reciprocating motion, pushes it on to the following grill which is generally fixed.

On its lower portion, and disposed in such a way as to project below the grill, the grill element comprises a catch or latching means formed by a double hook 6 and 7 which permits the grill element to be fixed to a support by means of T-shaped connecting bar or rod 8, a transverse arm 9 of which is engaged by means of its end portions into the hooks 6 and 7, as shown in FIG. 3, while the leg 10 of the T-shaped connecting rod is secured to the support by means of its screwthreaded end portion 11. The pulling force which is thus applied by the leg 10 braces the grill element 1 firmly against its support, by way of contact support regions 12, 13, 14 and 15, the first two being disposed at the rearward end of the hooks and the other two being disposed on the lateral edges of the front portion 4.

Finally, the grill comprises an array of holes as indicated at 16 and 17, through which air is injected in an upward direction, under a relatively high pressure. The holes are generally conical with a small diameter on the order of 10 mm at their upper ends. A sort of bed of clinker of variable thickness, generally of the order of 200 to 300 mm, is formed on the movable grill element. The bed of clinker is constantly pushed by the combined action of an assembly of grill elements wich are alternately movable and fixed and which are disposed in succession from the outlet orifice of the furnace to the discharge region. During its movement along the assembly of grill elements, the termperature of the clinker progressively drops from about 1400° C. to the desired temperature level which is generally lower than 500° C.

Experience has shown that the movable grill elements as described above, and also the fixed grill elements, have a very short service life of the order of 3 to 12 months, in the hottest region of the apparatus. In fact, in spite of the injection of cold air, the grill elements are raised to a temperature of 1000° C. and even higher at their upper surfaces, in direct contact with the clinker. In addition, the grains of clinker are highly abrasive with regard to the steel in that temperature range and they therefore cause constant abrasion of the surface of the metal with which they are in contact. At the same time, the flow of air which has been raised to a high temperature by passing through the clinker causes direct oxidation of the top face of the grill element. Therefore, abrasion or erosion and oxidation of the upper face of the grill element occur simultaneously.

In order to reduce the rate of the oxidation-erosion phenomenon, refratory casting steels, for example the steel in accordance with standrad AFNOR Z 40 CN 25-20, may be used in known manner. In spite of the high Cr content of such a steel, the layer of protective oxide is being constantly eroded by the friction of the grains of clinker against the upper surface of the grill element. In addition, in spite of the intense cooling of the bottom surface of the grill element by the flow of air, which is at a relatively low temperature, the upper surface is raised to a temperature on the order of 1000° C. under normal conditions of operation by the contact, which is being continuously renewed, with the grains of clinker which drop from the outlet orifice of the furnace and which are therefore at an initial temperature of 1400° C. or higher.

It is found in particular that, in the vicinity of the above-described latching means, the alloy is subjected to preferential attack at the joints between the grains of its structure. In fact, because of the relatively large volume of the hooks 6 and 7, feed runners or sprues have to be provided in the vicinity of that latching region, when the steel is cast. That results in cooling being much slower, which in turn causes a substantial increase in the coarseness of the grain. Moreover, the latching region which is applied to the surface of the grill element constitutes a weak point in the structure thereof.

In some cases, the tensile forces resulting from mechanical and thermal stresses applied by the transverse arm 9 of the connecting member 8 to the hooks 6 and 7 can cause fractures to occur. In order to prevent that from happening, the thicknesses of the components have to be increased, which therefore increases the weight of the grill elements, and this is an unfavorable consideration from the point of view of the size of the metal grain and also from the point of view of the movable grill elements being mechanically driven with a reciprocating motion.

Research has therefore been done into the possibility of removing the hooks which are disposed in a projecting relationship on the underside of the grill, and integrating the latching means into the grill itself. Research was also done into the possibility of being able to set the T-shaped connecting member 8 in position from the upper surface of a grill element, with the transverse arm 9 which forms the head of the connecting member resting on the upper surface of the grill, but without being exposed to the direct radiation of the grains of clinker, which are at very high temperature.

SUMMARY OF THE INVENTION

All of the aforementioned difficulties may be overcome with a fixed or movable grill element according to the present invention for heat exchange between a divided solid which is at a very high temperature, and a fluid at a lower temperature. This grill element comprises a plate of refractory steel, the top face of which receives the grains or particles of the solid, this plate comprising an array of holes through which the fluid passes in an upward direction. The top face of the plate comprises at least one recessed region, the bottom of which comprises a hole in which the leg of a connecting member is engaged, the head of this connecting member being retained within the recessed region in a position of bearing against the edges of the hole. The depth of this recessed region is greater than the height of the head of the connecting member that it contains. Preferably, the depth of the recessed region is about 2 to 6 times the mean thickness of the refractory steel plate. Preferably also, the top face of the plate comprises relief or raised potions such as ribs which are disposed in a crisscross configuration forming cells. Finally, the grill element preferably comprises a cast steel which is of the following composition in percent by weight:

| C | 0.30 to 0.70 |
|---|---|
| Cr | 24 to 29 |
| Ni | 11 to 15 |
| Mn | 7 to 11 |
| Si | 1 to 2 |
| Fe and various impurities | Balance |

DESCRIPTION OF THE PREFERRED EMBODIMENTS

Figure 4:
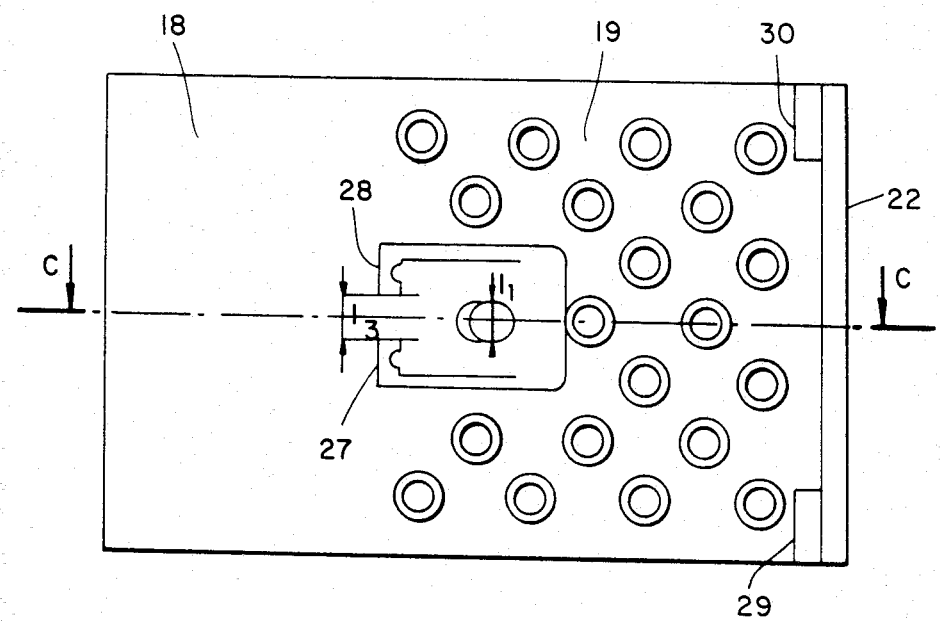
FIG. 4 shows a view along line D (in FIG. 5) of the bottom face of a grill element according to the invention.
Figure 5:
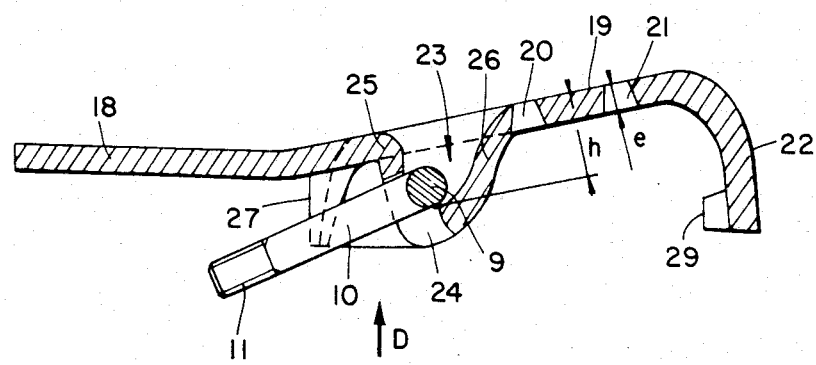
FIG. 5 is a view of the grill element according to the invention in section taken along line CC in FIG. 4, with the connecting member shown in FIG. 2 illustrated in the latching position.

FIGS. 4 and 5 show a first embodiment of the grill element comprising the latching device according to the invention. Like the known grill element shown in FIGS. 1 and 3, the grill element shown in FIGS. 4 and 5 comprises a substantially horizontal region 18 and an inclined region 19 which has holes therethrough as indicated at 20 and 21, the end of the region 19 forming the front portion 22 of the grill element. In this case, the means for hooking or latching the grill to its support is formed by a recessed region forming a kind of dished or cup configuration 23, the walls of which are formed by the refractory steel plate itself, which takes up the form of the recessed region. A hole 24 is provided in the bottom of the recessed region, in such a way as to permit the leg 10 of the connecting member 8 to pass therethrough and also to permit the leg 10 to be disposed at the required angle relative to the horizontal, so that it can be connected in known manner to the grill element support to which it can be secured by means of its screwthreaded end 11. The known support is not illustrated.

The dimensions of the hole 24 are such that it has a cross-section much larger than the cross-section of the leg 10, being for example double, so as to permit a flow of cooling air to pass therethrough in an upward direction, thus making it possible to reduce the temperature of the head of the connecting member formed by the transverse arm 9. The width $l_1$ of the hole, when measured parallel to the axis of the arm 9, is such as to permit the leg 10 to pass easily therethrough, while still remaining much less than the width $l_2$ of the arm 9, so that the latter bears firmly and fixedly against the bottom of the recessed region 23, against the edge portion of the hole 24.

The width of the bottom of the recessed region 23, as measured parallel to the axis of the arm 9, is at least equal to $l_2$. The depth h thereof is such that the head of the connecting member, which is formed by the arm 9, is disposed at substantially the same level as that at which the arm 9 would be found if it had been engaged into the hooks 6 and 7 of the known latching means. At any event, the depth h of the recessed region must be greater than the height of the head of the connecting member which is contained in the recessed region. The side walls as indicatd at 25 and 26 are sloped at a relatively steep angle so that, in the course of use of the grill element according to the invention, a virtually fixed layer of solid grains such as grains of clinker is established, within the dish-like or cup-like configuration. That layer of material is cooled by the flow of air through the hole 24 and thus permits the arm 9 to be protected from excessive heating, which would reduce its mechanical strength to a level below the necessary value.

In practice, the depth h of the cup-like configuration, as measured with respect to the plane of the top face of the inclined region 19, is of the order of 2 to 6 times the mean thickness e of the plate in the inclined region 19. The thickness of the walls of the cup-like portion is close to e.

The grill element according to the invention also comprises, like the known grill element, support regions 27, 28, 29 and 20 which perform the same function as the support regions 12, 13, 14 and 15 of the known grill element. It will be noted that a space which is of a width $l_3$ is reserved between the regions 27 and 28, in the same way as between the regions 12 and 13, for the leg 10 of the connecting member 8 to pass therethrough. The transverse arm 9 which forms the head of the connecting member may be replaced by a head of a different shape, which is adapted to the dimensions of the cup configuration. The head must be of a section such that it cannot pass through the hole 24 and that it has a sufficient support area for bearing against the edge portions of the hole 24.

The grill element of the above-described design is produced by casting, without the necessity to provide one or more runners or sprues in the vicinity of the connecting member latching region. In fact, the walls of the recessed portion or dished portion 23 are formed by the actual wall portions of the grill, which are simply formed into a recessed configuration. It will be appreciated that no particular difficulties are involved in feeding liquid metal for forming the walls of the dished configuration. As regards the two raised or projecting portions which carry the support surfaces 27, the volume thereof is sufficiently limited that no particular problem is involved in feeding the liquid metal thereto. Therefore, at all points in the grill element, the cast structure produced is of a fine grain texture, which has enhanced resistance to high temperature oxidation. In addition, the tensile forces applied to the grill element by the head of the connecting member 8 formed by the arm 9 are applied directly to the bottom of the dished configuration, around the hole 24, and the bottom of the dished configuration is an integral part of the grill. There is therefore no longer any risk of fracture or breakage of the grill at the location of the latching region. Finally, the layer of clinker which remains in the dished configuration 23 and which is being constantly cooled by the flow of air passing through the hole 24 protects the head of the connecting member 8, which is formed by the transverse arm 9, and considerably limits the extent to which it is increased in temperature. In fact, with the depth of the recessed region being greater than the height of the head of the connecting member, the latter is covered by a virtually stationary layer of clinker.

The grill element according to the invention therefore enjoys an increased service life and is of reduced mass, by virtue of being more compact in structure.

It is possible for the levels of performance of the grill element according to the invention to be further enhanced by applying to the grill element, the improvements resulting from a previous study, in accordance with which the upper face of a fixed or movable grill element for solid-gas heat exchange at very high temperature is provided with relief or raised portions which are disposed on the path of movement of the solid particles or grains which are at high temperature, so as to constitute an obstacle to the flow of the fraction of those grains or particles which is in contact with the upper face of the grill element or which is in the immediate vicinity thereof.

In particular, ribs may be provided in the region of the grill element which has the holes therethrough, such ribs defining cells within which are disposed one or more holes for a flow of cooling air therethrough. By virtue of the provision of such ribs, the solid particles or grains which are in contact with the bottom of each cell or which are in the immediate vicinity thereof are retained within the cells or at least retarded in their movement. Under those circumstances, even if the air flow which is injected through the holes carries along a certain number of grains or particles out of the cell, it still cools a semi-static layer of grains or particles, the temperature of which is thus considerably reduced.

Figure 6:
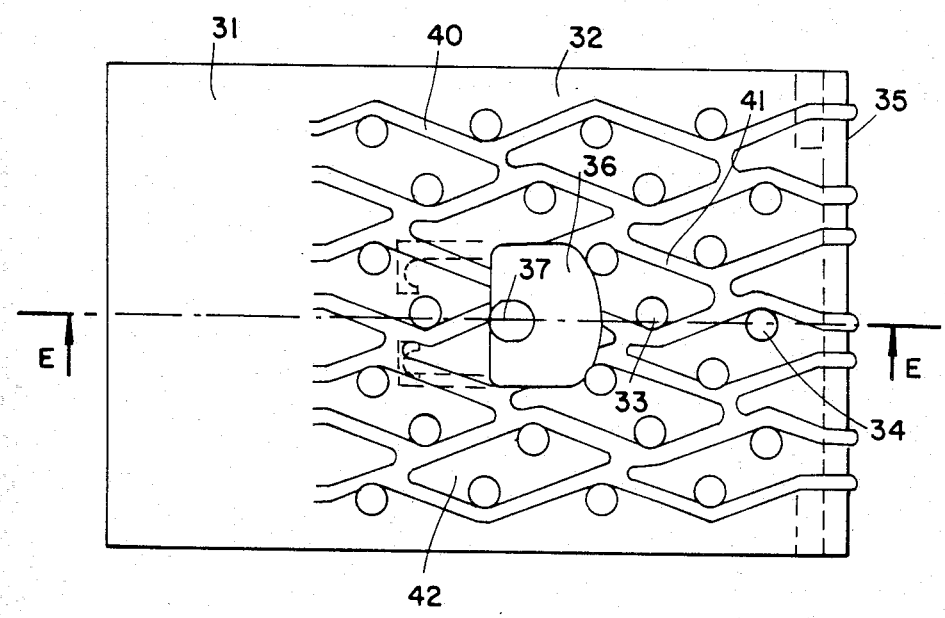
FIG. 6 shows a view taken along the line G (FIG. 7) of the top face of a grill element according to the invention.
Figure 7:
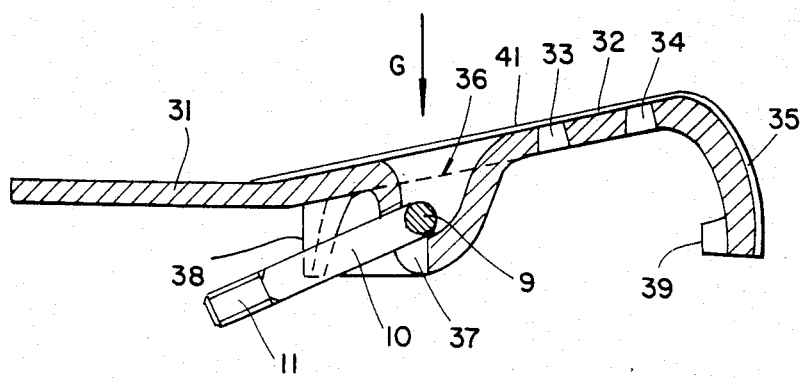
FIG. 7 shows a view of the ribbed grill element according to the invention as shown in FIG. 6, in cross-section taken along line EE in FIG. 6, with the connecting member of FIG. 2 being shown in the latching position.

Reference is now made to FIGS. 6 and 7 showing a grill element according to the invention which comprises a substantially horizontal region 31 and an inclined region 32 with holes therethrough as shown at 33 and 34. The inclined region 32 is limited at its forward end by the front portion 35. The grill element comprises a recessed region or dished portion 36, the bottom of which has a hole 37 therethrough. As can be seen from FIG. 7, the leg 10 of a connecting member passes through the hole 37 in the bottom of the recessed region 36. The head of the connecting member which is formed by the transverse arm 9 is retained within the recessed portion 36. Like the grill element shown in FIGS. 4 and 5, the grill element illustrated in FIGS. 6 and 7 comprises support regions as shown at 38 and 39 which are braced against a support (not shown) by tightening the connecting rod member 8 which is secured to the support by means of its screwthreaded end portion 11. The top face of the inclined region 32 has an array of ribs as indicated at 40 and 41 which intersect in such a way as to form cells as shown at 42, within which are distributed the holes 33 and 34 through which the cooling air passes. The height of the ribs is such as to present an obstacle; under the conditions of use of the apparatus, to the movement of the solid grains which are in the immediate vicinity of the wall portion, or at least to retard such movement.

In the construction shown in FIGS. 6 and 7, the mean height of the ribs is about 5 mm, for a mean thickness which is also of the order of 5 mm. The mean wall thickness of the grill element in the inclined region 32 is about 10 mm. The less rapid movement of the solid grains, in contact with the wall of the grill element, by virtue of the presence of the ribs, promotes both a reduction in the temperature of the wall portion and a lower degree of erosion by friction. That results in a much improved level of mechanical resistance, which permits the thickness to be substantially reduced, but without reducing the service life.

The recessed region or dished portion 36 also behaves in the manner of a cell as indicated at 42, but its depth, being much more substantial, permits the formation of a relatively thick layer of stable grains, which effectively protects the arm 9 of the connecting rod member and, by virtue of the flow of cooling air through the hole 37, permits the arm 9 to be kept at a temperature which is much lower than the mean temperature of the grill element. That results in a high degree of operating reliability, with the dangers of fracture being virtually eliminated. At the same time, the drop in mean temperature of the grill element reduces the danger of deformation due to creep, and reduces the rate of oxidation. Finally, at least partial stabilization of the layer of solid grains in contact with the metal surface provides for a very substantial reduction in the rate of the oxidation-erosion process.

In order to further enhance the levels of performance of the grill element according to the invention, it is advantageous to make it from the refractory casting steel, of a composition known from a previous study. The composition of that steel, in percent by weight, is as follows:

| | |
|---|---|
| C | 0.30 to 0.70 |
| Cr | 24 to 29 |
| Ni | 11 to 15 |
| Mn | 7 to 11 |
| Si | 1 to 2 |
| Fe and various impurities | Balance |

Within that range, it is preferred to use the following composition, in percent by weight:

| | |
|---|---|
| C | 0.40 to 0.60 |
| Cr | 25 to 27 |
| Ni | 12 to 14 |
| Mn | 8 to 10 |
| Si | 1.3 to 1.8 |
| Al | $\leq 0.20$ |
| S | $\leq 0.05$ |
| P | $\leq 0.10$ |
| N | $\leq 0.20$ |
| Fe and other unavoidable impurities | Balance |

Experience has shown that the grills which are produced by casting using the steel described above have particularly good resistance to atmospheres containing sulphur oxides and are capable of being maintained over very long periods of time at any temperature which falls within the range between 750° and 1100° C.

Finally, the dangers of metal fatigue due to the formation of sigma phase in the regions which are in the temperature range between 750° and 850° C. are minimized.

A very large number of variations and alternative constructions may be applied to the grill element according to the invention. In particular, the shape and the dimensions of the recessed region or dished portion in which the head of the connecting rod member 9 is engaged may vary within wide limits. Likewise, the connecting member 8 may be made in many different ways. In particular, instead of using a transverse arm 9 as the head of the connecting member 8, it is possible to use a head of any shape whatever, the dimensions thereof being such that it cannot pass through the hole in the bottom of the recessed region in which the leg 10 is engaged. More particularly, it is possible to adapt the head of the connecting member to the shape of the bottom of the recessed portion, so as to provide for stable support therefor, and to distribute the forces involved. Likewise, the head may be of a section and a configuration which vary widely in shape, depending on the way in which the leg is connected to the support.

The only requirement is that the leg can pass through the hole in the bottom of the recessed portion without difficulty and can be oriented in the desired manner so that it can be connected to the support, by way of its end portion.

The end portion of the leg can be secured to the support by a nut and screwthread means or by any other means known to one skilled in the art.

Finally, the hole in the bottom of the recessed portion must be of a sufficient cross-section to permit the cooling fluid to pass therethrough, in spite of the presence of the leg passing through the hole.

It is possible to make one or more other holes in the wall portions of the recessed region, in order to increase the circulation of the cooling fluid. It is also possible optionally to produce grill elements in accordance with the invention, which comprise a plurality of connecting members housed in one or more recessed regions.

Many other modifications may be made in the grill element, without departing from the scope of the invention.

What is claimed is:

1. A fixed or movable grill element for heat exchange between a divided solid at very high temperature and a fluid at lower temperature which grill element is adapted to be at least releasably fixed to a support by a connecting member including a head and a leg attached thereto, comprising a plate of cast refractory steel having upper and lower faces, said upper face receiving the grains or particles of the solid which are displaced along said upper face, said plate comprising an array of through perforations defining holes through which the fluid passes in an upward direction, the upper face of the plate comprising at least one recessed region in which a portion of said upper face is at a depth relative to the remainder of said upper face, which depth is greater than the height of the connecting member that it contains, and wherein said portion of said upper face at the region of greatest depth is below said lower face in the region surrounding the recessed region, the bottom of this recessed region comprising at least one through perforation defining a hole in which the leg of the connecting member is engaged, the head of the connecting member being retained within said recessed region in a position of bearing against the edge portions defining the hole in which the leg is engaged.

2. A grill element according to claim 1, wherein the depth of the recessed region is about 2 to 6 times the mean thickness of the refractory steel plate.

3. A grill element according to claim 1, wherein the end portion of the leg of the connecting member, which is remote from the head, comprises a means for fixing the leg to the support.

4. A grill element according to claim 3, wherein the means for fixing the leg to the support comprises a screwthread.

5. A grill element according to claim 1, wherein the upper face of the plate comprises relief portions disposed on the path of movement of the solid particles or grains, so as to present an obstacle to the flow of the fraction of said grains or particles which is in the immediate vicinity of the surface of the plate.

6. A grill element according to claim 5, wherein the relief portions comprise ribs which intersect, forming cells.

7. A grill element according to claim 1, comprising a cast steel having a composition which comprises in percent by weight:

| | |
|---|---|
| C | 0.30 to 0.70 |
| Cr | 24 to 29 |
| Ni | 11 to 15 |
| Mn | 7 to 11 |
| Si | 1 to 2 |
| Fe and various impurities | Balance |

8. A grill element according to claim 1, wherein the diameter of the through performation at the bottom of said recessed region is substantially greater than the diameter of the leg of the connecting member.

* * * * *